United States Patent
O'Byrne et al.

(10) Patent No.: US 7,932,813 B2
(45) Date of Patent: Apr. 26, 2011

(54) SAMPLING TO OBTAIN SIGNAL FROM RFID CARD

(75) Inventors: Hugh Donal O'Byrne, South Bend (IN); Sidney W. Smith, Baton Rouge, LA (US); James Donald Pauley, Cedar Lake, IA (US)

(73) Assignee: RF IDeas, Inc., Schaumburg, IL (US)

( * ) Notice: Subject to any disclaimer, the term of this patent is extended or adjusted under 35 U.S.C. 154(b) by 1027 days.

(21) Appl. No.: 11/799,933

(22) Filed: May 3, 2007

(65) Prior Publication Data

US 2008/0272892 A1 Nov. 6, 2008

(51) Int. Cl.
*H04Q 5/22* (2006.01)

(52) U.S. Cl. ...... 340/10.1; 455/501; 455/63.1; 455/296; 375/346

(58) Field of Classification Search ................. 340/10.1; 327/91, 94; 455/501, 63.1, 296; 375/346
See application file for complete search history.

(56) References Cited

U.S. PATENT DOCUMENTS

| | | | | |
|---|---|---|---|---|
| 4,517,520 A | * | 5/1985 | Ogawa | 329/348 |
| 5,313,198 A | * | 5/1994 | Hirao et al. | 340/10.51 |
| 5,952,935 A | | 9/1999 | Mejia et al. | |
| 5,974,301 A | * | 10/1999 | Palmer et al. | 455/63.1 |
| 6,172,609 B1 | | 1/2001 | Lu et al. | |
| 7,116,212 B2 | | 10/2006 | Horwitz et al. | |
| 2003/0090367 A1 | * | 5/2003 | Carroll et al. | 340/10.4 |

OTHER PUBLICATIONS

Shen et al. ISSC C96/Session 3/Communications Building Blocks/Paper TP 3.4: "A 900 MHz Integrated Discrete-Time Filtering RF Front-End", Feb. 8, 1996.*
"A 900 MHz RF Front End with Integrated Discrete Time Filtering", Shen et. al., IEEE Journal of Solid State Circuits, vol. 31, No. 12, Dec. 1996.*
Author Unknown, *Phase-shift keying* "http://en.wikipedia.org/wiki/Phaseshift_keying" From Wikipedia, the fee encyclopedia.
Author Unknown, *Q Factor*, "http://en.wikipedia.org/wiki/QFactor" From Wikipedia, the free encyclopedia.
Author Unknown, *Radio Frequency Identification* "http://en.wikipedia.org/wiki/Rfid" From Wikipedia, the free encyclopedia.
Author Unknown, *Amplitude-shift keying* "http://en.wikipedia.org/wiki/Amplitudeshift_keying" From Wikipedia, the free encyclopedia.
Author Unknown, *Counter*, "http://en.wikipedia.org/wiki/Counter" From Wikipedia, the free encyclopedia.
Author Unknown, *Frequency-shift keying* "http://en.wikipedia.org/wiki/Frequencyshift_keying" From Wikipedia, the free encyclopedia.
Author Unknown, *Modulation* "http://en.wikipedia.org/wiki/Modulation" From Wikipedia, the free encyclopedia.

* cited by examiner

*Primary Examiner* — Daniel Wu
*Assistant Examiner* — Frederick Ott
(74) *Attorney, Agent, or Firm* — Robert J. Brill; Brill IP Law Office

(57) ABSTRACT

A radio frequency identification (RFID) reader of an apparatus in an example employs substantially synchronized sampling to obtain a signal from an RFID card notwithstanding employment by the RFID card of any of amplitude shift keying (ASK), frequency shift keying (FSK), or phase shift keying (PSK). The RFID reader decodes the signal notwithstanding the employment by the RFID card of any of ASK, FSK, or PSK.

22 Claims, 3 Drawing Sheets

SAMPLING TO OBTAIN SIGNAL FROM RFID CARD

BACKGROUND

The radio frequency identification (RFID) industry employs a number of frequencies and modulation techniques to communicate information between cards and readers. The reader comprises a crystal and additional electronics that serve to generate a carrier signal of usually one hundred twenty-five (125) kHz. The access control portion of the industry has historically employed the carrier signal frequency to power passive credit-card-size cards that communicate codes back to the reader. The magnetic field generated by the carrier signal frequency serves to power, at a range of a few inches or several centimeters, the credit-card-size cards that comprise a coil resonated by a capacitor and electronics such as an integrated circuit (IC) powered and clocked by the magnetic field. The electronics of the card responds to the magnetic field and loads coded information from the card onto the magnetic field in a time dependent manner that is determined by the card electronics. The card communicates a unique serial code of usually thirty-two (32) to two hundred fifty-six (256) bits back to the reader to establish the identity of the holder or owner of the card.

The card employs modulation techniques that depend on the particular manufacturer of the equipment. The various manufacturers of access control equipment have chosen differing modulation techniques to transfer information in a bit stream from the cards to the reader. Common modulation techniques employed with access control cards comprise: direct modulation of the carrier signal in amplitude-shift keying (ASK); frequency-shift keying (FSK) modulation of a sub-carrier signal generated by the electronics of the card; or phase-shift keying (PSK) modulation of a sub-carrier signal generated by the electronics of the card. The electronics of the card typically employs digital division of the carrier signal frequency to generate the bit rates and sub-carrier signal frequencies. The electronics of the card usually imparts additional encoding and bits to the serial code such as Manchester and/or bi-phase encoding, and/or parity bits and/or check sums, to provide a serial card data stream as an output.

DESCRIPTION OF THE DRAWINGS

Features of exemplary implementations of the invention will become apparent from the description, the claims, and the accompanying drawings in which:

DETAILED DESCRIPTION

Figure 1:
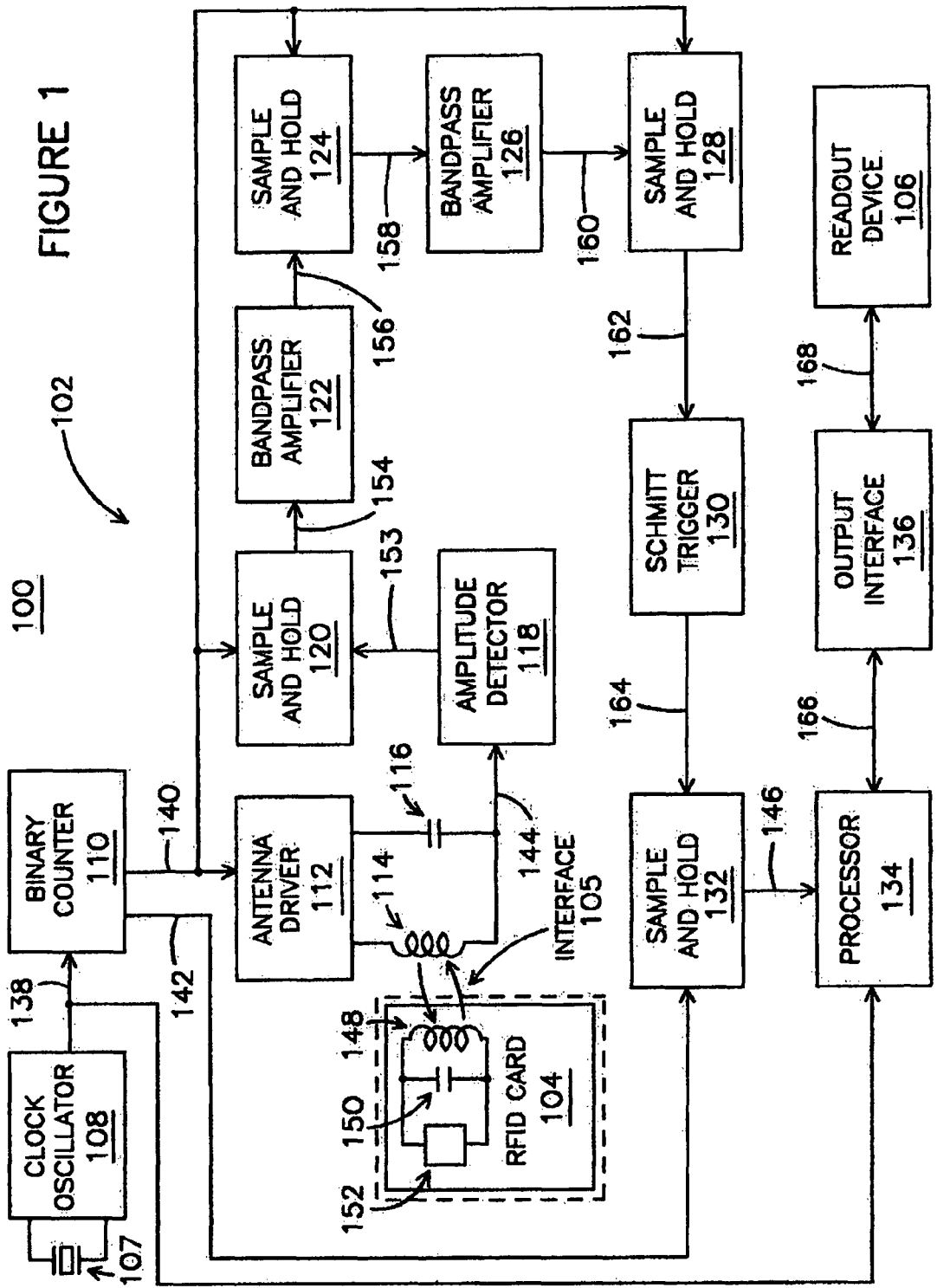
FIG. 1 is a representation of an implementation of an apparatus that comprises a radio frequency identification (RFID) reader, an RFID tag and/or card, a card-reader interface, and/or a readout device.

Referring to the BACKGROUND section above, a typical access control reader employs a magnetic field generator coupled with a peak detector that serves to detect modulation of the magnetic field by the card. The output of the detector is amplified and then digitized by a Schmitt trigger. The digitized signal is then decoded by a processor, for example, a microprocessor, and data is transferred out of the reader, often in a security card data encoding format such as Wiegand format, for example, the standard 26-bit format. A consideration for the circuit designer is that the modulation can be very small compared to the carrier signal amplitude. So, the signal processing may involve enhancement of the modulation signal and rejection of the carrier signal frequency of usually one hundred twenty-five (125) kHz. An implementation may relatively easily handle amplitude-shift keying (ASK) signals, but may have progressively more difficulty with frequency-shift keying (FSK) signals and phase-shift keying (PSK) signals, for example, as the frequencies of interest are closer to the carrier signal frequency and the detected signal is smaller in amplitude relative to the carrier signal amplitude. In a case of PSK, the sub-carrier signal frequency may comprise a relatively small separation such as only an octave below the carrier signal and the recovered signal may be very small, for example, due to a typically high Q factor of an antenna coil of the reader magnetic field generator. A high Q factor slows the response of the reader antenna amplitude, which accounts for the relatively low level of response to PSK signals at one octave below the carrier signal frequency.

The direct modulation of the carrier signal in ASK usually occurs at approximately two (2) or four (4) kHz, derived by dividing the carrier signal frequency by sixty-four (64) or thirty-two (32). The FSK modulation of a sub-carrier signal usually occurs by the data stream switching the sub-carrier signal between 12.5 kHz and 15.625 kHz, derived by dividing the carrier signal frequency by ten (10) or eight (8). Typical PSK modulation of a sub-carrier signal occurs from influence of the serial data stream upon the sub-carrier signal, derived by dividing the carrier signal by two (2) and phase shifting the carrier signal usually by one hundred eighty (180) degrees.

The various possible modulation techniques present a consideration for manufacturers of reader equipment that may need to receive any of the modulation techniques. For example, computers can be equipped with card readers to control access to their use. A manufacturer of the computer could need to incorporate different readers for each of the possible modulation techniques and card data stream formats.

Multiple signal paths have been employed for the different modulation techniques. The reading of multiple formats of low frequency passive radio frequency identification (RFID) tags can operate by first determining the nature of the modulation being received and then directing the received signal through an amplifier specific to the modulation bandwidth. Various techniques have served to determine or direct the path that corresponds to a particular modulation scheme such as passive filtering, active processor determination, time-share multiplexing, or user-determination either manually or by computer control. The different modulation techniques can lead to complex circuits, for example, with different portions used for the various modulation techniques. The requirement of the separate signal paths for the various modulation techniques can add complexity and cost.

An exemplary approach deals with ASK, FSK, and PSK all in a signal path design. An exemplary implementation comprises a multi-mode RFID Reader. An exemplary implementation employs a synchronous and/or substantially synchronous sampling technique that allows a reader to read access control cards from a variety of manufacturers with a relatively simple and/or inexpensive electronic circuit. An exemplary implementation employs sampling that allows ASK, FSK, and PSK modulation techniques to pass a usable signal to a processor for reducing that signal to an identification (ID) number. In an exemplary implementation, sampling synchronous and/or substantially synchronous with the reader excitation field provides a desired rejection of the carrier signal frequency. In an exemplary implementation, the signal coming from the card is synchronous and/or substantially synchronous with the magnetic field generated by the reader to allow the card data stream to be recovered with a simple reader circuit regardless of the modulation technique employed.

Turning to FIG. 1, an implementation of an apparatus 100 in an example comprises a radio frequency identification (RFID) reader 102, an RFID tag and/or card 104, a card-reader interface 105, and/or a readout device 106. The card-reader interface 105 in an example comprises a magnetic field generated by an antenna 114 of the RFID reader 102. The RFID card 104 in an example loads the magnetic field in a predetermined way, for example, through employment of a predetermined card data stream to provide information on a carrier signal. The RFID card 104 in an example comprises a passive, proximity, and/or contactless card. As described herein, electronics of the RFID card 104 in an example responds to the magnetic field and loads coded information from the RFID card 104 onto the magnetic field in a time dependent manner that is determined by the electronics. The RFID card 104 in an example communicates a unique serial code, for example, of thirty-two (32) to two hundred fifty-six (256) bits, back to the RFID reader 102 to establish an identity of a holder or owner of the RFID card 104.

The RFID reader 102 in an example comprises a crystal 107, a clock oscillator 108, a binary counter 110, an antenna driver 112, an antenna 114, a capacitor 116, an amplitude detector 118, a sample and hold circuit 120, a bandpass amplifier 122, a sample and hold circuit 124, a bandpass amplifier 126, a sample and hold circuit 128, a Schmitt trigger 130, a sample and hold circuit 132, a processor 134, and an output interface 136.

The crystal 107 and the clock oscillator 108 in an example cooperate to produce a frequency 138 output from the clock oscillator 108 for input to the binary counter 110. The frequency 138 in an example may be selected to comprise a substantially binary or power-of-two multiple of an RFID industry standard frequency, for example, a substantially binary multiple and/or power of two multiple of one hundred twenty-five (125) kHz that may be selected in view of an exemplary guide and/or standard for the RFID card 104. The binary counter 110 in an example comprises the frequency 138 that is input to the binary counter 110 from the clock oscillator 108 and a plurality of frequencies 140, 142 that are output from the binary counter 110. The binary counter 110 in an example outputs the frequencies 140, 142 as substantially square waves.

The binary counter 110 in an example comprises a plurality of stages, for example, arranged in series. Each stage of the binary counter 110 in an example serves to divide by two (2) the frequency input to that stage, such as from a preceding stage or, such as at the initial stage, directly from the clock oscillator 108. An exemplary input of eight (8) MHz from the clock oscillator 108 to a binary counter 110 that comprises a plurality of stages in an example comprises a number of outputs such as any of four (4) MHz, two (2) MHz, one (1) MHz, five hundred (500) kHz, two hundred fifty (250) kHz, one hundred twenty-five (125) kHz, sixty-two and one-half (62.5) kHz, and so on as may be desired and/or selected.

An exemplary binary counter 110 comprises a frequency 138 of eight (8) MHz as an exemplary input and frequencies 140, 142 of one hundred twenty-five (125) kHz and sixty-two and one-half (62.5) kHz, respectively, as exemplary outputs. The frequency 140 in an example may be selected to conform to an RFID industry standard. For example, one hundred twenty-five (125) kHz may be selected for the frequency 140 in view of an exemplary guide and/or standard for the RFID card 104. An exemplary guide and/or standard for the RFID card 104 may identify a number of low frequencies such as one hundred twenty-five (125) to one hundred thirty-four and two-tenths (134.2) kHz or one hundred forty (140) to one hundred forty-eight and one-half (148.5) kHz and one or more high frequencies such as thirteen and fifty-six hundredths (13.56) MHz that may be employed with the RFID card 104, for example, globally and/or without a license.

An exemplary frequency 142 comprises a PSK sampling frequency. The frequency 142 in an example may be selected to comprise one-half the frequency 140, for example, in view of a technique to demodulate PSK signals through employment of the frequency 142 at one-half the frequency 140 to sample signal 153 that is recovered from signal 144 through employment of the amplitude detector 118.

The RFID reader 102 in an example employs the frequencies 140, 142 from the binary counter 110 to generate the reader magnetic field through employment of the antenna 114, and to sample the modulation from the RFID card 104, present in the signal 144. The RFID reader 102 in an example employs the frequency 140 to generate a magnetic field that causes the RFID card 104 to modulate the signal 144 based on the frequency 140. The frequency 140 in an example serves to excite the RFID card 104 to cause the modulation through employment of varying of the absorption of energy from the magnetic field or by converting energy from the magnetic field generated by the RFID card 102 to energy at the frequency 142 as an exemplary different frequency, for example, at one-half of the frequency 140 as an exemplary magnetic field frequency. Information from the RFID card 104 is transferred over the card-reader interface 105 through employment of magnetic field coupling between the antenna coils, for example, the coils of the antenna 148 of the RFID card 104 and the coils of the antenna 114 of the RFID reader 102. The modulating effect of the RFID card 104 in an example is recovered from the signal 144 through employment of the amplitude detector 118. The electronics of the RFID card 104 in an example imparts additional encoding and bits to the serial code such as Manchester and/or bi-phase encoding, and/or parity bits and/or check sums, to provide a serial card data stream for the signal 144.

The RFID reader 102 in an example employs sampling that allows ASK, FSK, and PSK modulation techniques to pass a signal 146, for example, as a form of the signal 144, to the processor 134 for reducing the signal 146 to information and/or data, for example, an identification (ID) number. An exemplary identification number comprises a serial code that serves to establish the identity of a holder and/or owner of the RFID card 104. An exemplary identification number comprises a unique number and/or string between thirty-two (32) and two hundred fifty-six (256) bits. The processor 134 in an example comprises a microprocessor. The processor 134 may comprise an exemplary implementation of an algorithm, procedure, program, process, mechanism, engine, model, coordinator, module, application, code, and/or logic. The processor 134 in an example comprises a processor core, memory, and input/output (IO) ports. As described herein, an exemplary memory of the processor 134 in an example comprises a library of possible data stream formats.

An exemplary RFID reader 102 performs sampling before passing the signal 146 to the processor 134. The signal 146 in an example comprises the card data stream in the case of an ASK card, an FSK signal modulated by the card data stream in the case of an FSK card, or the card data stream in the case of a PSK card. Since PSK signals in an example are demodulated by sample and hold circuit 132, the processor 134 in an example does not have to operate on a signal at 62.5 kHz. By virtue of the demodulation of PSK signals by the sample and hold circuit 132 in an example PSK cards as the RFID card 104 present as ASK-like signal to processor 134. The signal 146 in an example comprises a relatively lower frequency to allow the processor 134 to more easily handle the signal 146, for example, rather than the processor 134 needing to handle a relatively higher PSK sampling frequency, for example, the frequency 142.

If the signal 144 comprises FSK in an example then the signal 146 passed to the processor 134 continues as FSK modulated by the card data stream. If the signal 144 comprises PSK in an example then the signal 146 passed to the processor 134 comprises the card data stream. If the signal 144 comprises ASK in an example then the signal 146 passed to the processor 134 comprises the card data stream. So, the RFID reader 102 in an example serves to eliminate PSK as a modulation technique that the processor 134 may need to consider in processing of the signal 146, for example, as a form of the signal 144. Also, the RFID reader 102 in an example upon receipt of the signal 146 need look for only FSK and/or ASK, for example, where ASK in the signal 146 may represent the card data stream that could have been ASK or PSK in the signal 144.

The antenna driver 112 in an example serves to drive the antenna 114 that is resonated by the capacitor 116. The antenna drive 112 in an example comprises a voltage between five (5) and ten (10) volts. The antenna 114 in an example comprises a voltage between one hundred (100) and three hundred (300) peak-to-peak volts. The antenna 114 in an example comprises a relatively high Q factor.

The RFID card 104 in an example comprises an antenna 148, a capacitor 150, and a circuit such as integrated circuit (IC) 152. The RFID card 104 in an example omits any internal power supply. The frequency 140 from the antenna 114 of the RFID reader 102 induces sufficient electrical current in the antenna 148 of the RFID card 104 to power the integrated circuit 152 for transmission of the signal 144 from the integrated circuit 152 and the antenna 148 to the antenna 114, for example, as a response from the RFID card 104 to the RFID reader 102. The RFID card 104 in an example backscatters the frequency 140 from the RFID reader 102. The antenna 148 in an example serves to collect power from the frequency 140 and transmit the signal 144 as an outbound backscatter signal. The signal 144 in an example comprises an identification number. An exemplary identification number serves to establish the identity of a holder and/or owner of the RFID card 104. In a further example, the integrated circuit 152 may comprise memory for transmitting data in addition to the identification number. For example, the 144 signal may also comprise one or more codes identifying particular facilities or geographic locations.

The sample and hold circuits 120, 124, and 128 in an example serve to filter out a carrier signal such as 125 kHz as the frequency 140 from the signal 144 coming from the RFID card 104. Signal 164 from the sample and hold circuit 132 to the processor 134 in an example could be an ASK, an FSK, or a PSK signal depending on the type of the RFID card 104 presented. Sample and hold circuit 132 in an example demodulates PSK signals making them look very much like ASK signals. FSK and ASK signals as the signal 164 in an example pass through the sample and hold circuit 132 without being affected. The processor 134 in an example is presented with an ASK, an ASK-like signal, or an FSK signal as the signal 146. The processor 134 in an example then determines the type of the signal 146 as ASK, ASK-like based on PSK, or FSK. The processor 134 in an example then employs a library of possible data stream formats to determine which format is in use. The processor 134 in an example employs the format in use to decode the signal 146.

The amplitude detector 118 in an example comprises a peak detector, for example, a diode, capacitor, and resistor. The amplitude detector 118 in an example participates in extraction of the signal 144 from the RFID card 104. The amplitude detector 118 in an example passes the signal 144 to the sample and hold circuit 120.

The sample and hold circuit 120 in an example is synchronous and/or substantially synchronous with the frequency 140. The sample and hold circuit 120 in an example employs the frequency 140 to pace and/or regulate sampling of the signal 153 by the sample and hold circuit 120. The sample and hold circuit 120, 124, 128, 132 in an example employs the frequency 140 or 142 to periodically determine an instantaneous value of the signal input thereto. The frequency 140 or 142 in an example serves to pulse the sample and hold circuit 120, 124, 128, 132 for storage of a voltage level of the input signal on a capacitor therein. The voltage level in an example remains on the capacitor until the sample and hold circuit 120, 124, 128, 132 is pulsed again. The voltage on the capacitor in an example is stepped to the measured voltage level. The sample and hold circuit 120, 124, 128, 132 in an example serves to convert the signal input thereto from time-varying to a stair-step profile. The sample and hold circuit 132 in an example demodulates a PSK signal input as the signal 146 and recovers a data stream signal, for example, a signal that originated in the operation of the integrated circuit 152.

In addition, an exemplary sample and hold circuit 120, 124, 128, 132 samples a signal input thereto at the frequency 140 or 142 to substantially eliminate that frequency 140 or 142 and its harmonics from the signal. For example, the sample and hold circuit 120 may sample the signal 153 at the frequency 140 to substantially eliminate the frequency 140 and its harmonics from a signal 154 output from the sample and hold circuit 120 based on the signal 153. In an exemplary implementation where the frequency 140 comprises 125 kHz, an exemplary employment of the frequency 140 by the sample and hold circuit 120 to sample the signal 153 serves to substantially constrain the influence and/or contamination of the signal 153 by the frequency 140 to thirty (30) to forty (40) dB.

The bandpass amplifier 122 in an example serves to amplify the signal 154. This signal in an example may be any one of ASK, FSK or PSK modulated. The gain of the amplifier 122 in the example may apply higher gain to PSK than to FSK modulated signals, and higher gain to FSK than to ASK signals, for example, to provide compensation for the relatively high Q factor of the antenna 114.

The sample and hold circuit 124 in an example is synchronous and/or substantially synchronous with the frequency 140. The sample and hold circuit 124 in an example employs the frequency 140 to pace and/or regulate sampling of the signal 156 by the sample and hold circuit 124. In an exemplary implementation where the frequency 140 comprise 125 kHz, the employment of the frequency 140 by the sample and hold circuit 124 to sample the signal 156 serves to constrain the influence and/or contamination of the signal 156 by the frequency 140.

The bandpass amplifier 126 in an example augments the gain for PSK modulated signals to further compensate for generally low level signals derived from PSK cards as the RFID card 104. The bandpass amplifier 126 in an example provides significant gain at half of the frequency 140 while not substantially affecting ASK or FSK modulated signals. The bandpass amplifier 126 in an example may be directed at 62.5 kHz, which is one octave below the 125 kHz antenna signal 144 which is at 125 kHz. The bandpass amplifier 126 in an example comprises a gain at 125 kHz. An exemplary implementation employs the sample and hold circuit 128 combined with the bandpass amplifier 126, so 62.5 kHz signals can be amplified while 125 kHz signals, only one octave away from 62.5 kHz, can be rejected. Sampling at 125 kHz in an example greatly attenuates signals at that same frequency of 125 kHz, but provides sufficient and/or acceptable samples to pass 62.5 kHz and other lower order subharmonics such as those present in FSK and ASK signals.

The sample and hold circuit 128 in an example is synchronous and/or substantially synchronous with frequency 140 and acts to reduce contamination of the signal 160 by the frequency 140. Signal 162 in an example results from the sample and hold circuit 128 and comprises an input to Schmitt Trigger 130. The Schmitt Trigger 130 in an example converts an analog signal as the signal 162 to a digital signal as the signal 164. The digital signal as the signal 164 in an example comprises a card data stream for an ASK card, a frequency modulated square wave at 12.5/15.625 kHz for an FSK card, or a phase modulated square wave at 62.5 kHz for a PSK card.

The sample and hold circuit 132 in an example samples the signal 164 at frequency 142 which is one-half of frequency 140 and the same as that for the carrier of a PSK card as the RFID card 104. Sampling a one hundred eighty (180) degree PSK signal at the frequency 140 of the carrier in an example results in a recovery of the card data stream as an exemplary identification (ID) signal from the signal 144. Sampling of lower frequency signals such as those present in FSK and ASK at the frequency 142 in an example results in the FSK or ASK signals being passed on to the processor 134 relatively unchanged. The resulting signal as the signal 146 in an example comprises the card data stream for a PSK card as the RFID card 104, the card data stream for an ASK card as the RFID card 104, or the frequency modulated signal for an FSK card as the RFID card 104. So the signal 146 presented to the processor 134 in an example is either a card data stream or an FSK signal modulated by a card data stream.

An exemplary approach presents the processor 134 with either a card data stream or an FSK signal modulated by a card data stream, but not with a higher frequency PSK signal modulated by a card data stream. An exemplary implementation conserves the processing capability of the processor 134 such as for a task of looking at the signal 146 and converting the signal 146 to a standardized output, for example, a Wiegand format.

One or more signals 166 are output from the processor 134 to the output interface 136. The output interface 136 in an example serves to provide selected, appropriate, correct, and/or proper voltage, impedance, and/or current levels such as for standard data transmission protocols, for example, Wiegand format, RS-232, RS-485, etc. The output interface 136 in an example may allow and/or provide for transmission of data both from and to the processor 134.

An exemplary readout device 106 is capable of accepting and responding to a signal provided by the output interface 136 of the RFID reader 102. The RFID reader 102 and the readout device 106 in an example comprise separate and/or distinct components. In another example, the RFID reader 102 comprises the readout device 106. The readout device 106 in an example receives and/or accepts a signal 168 from the output interface 136, for example, and performs an activity desired upon presentation of the RFID card 104. Exemplary activities performed by the readout device 106 comprise access to a computer and/or the information therein, access to a building and/or a room, process control, and/or display of a card number and/or information associated with the particular RFID card 104. The readout device 106 in an example may also communicate information back to the processor 134, for example, through the output interface 136.

Figure 2:
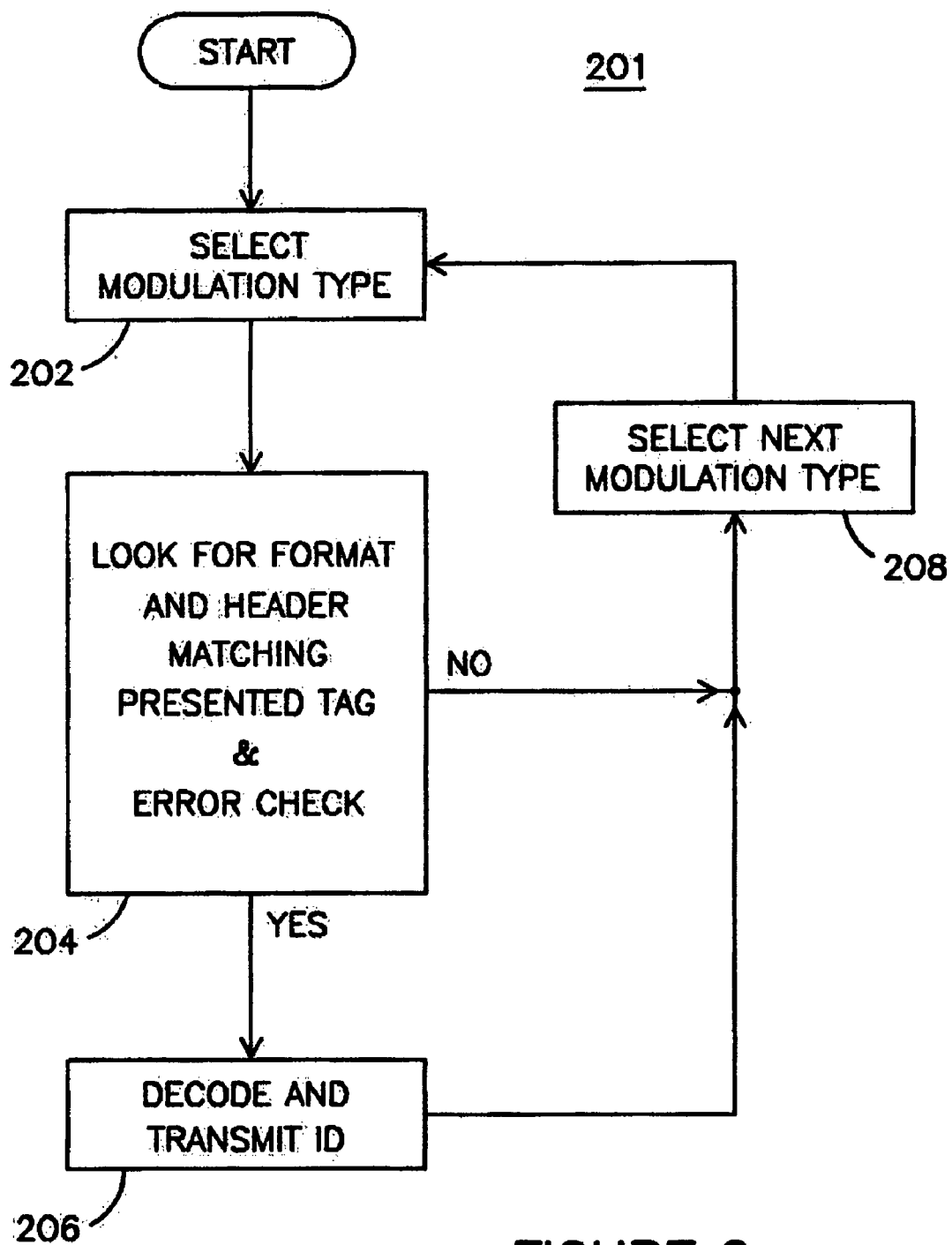
FIGS. 2 and 3 represent an exemplary logic flow that may be performed by the RFID reader for searching for one of a plurality of possible signal formats of the RFID card of an implementation of the apparatus of FIG. 1.

An illustrative description of an exemplary operation of an implementation of the apparatus 100 is presented, for explanatory purposes. FIG. 2 is a representation of an exemplary logic flow 201 for searching for one of a plurality and/or multiplicity of possible signal formats of the RFID card 104. The logic flow 201 in an example is performed by the RFID reader 102. The processor 134 of the RFID reader 102 in an example performs the logic flow 201. STEP 202 in an example assumes an incoming signal such as the signal 146 based on the signal 144 comprises a first modulation type, for example ASK. STEP 204 in an example examines the signal 146 for all of the ASK formats and headers of interest which might match the incoming tag signal, and checks for errors. If at any time in the examination it is found that the modulation type assumption is wrong, then in an example STEP 208 selects a next modulation type, for example FSK. STEP 208 in an example then proceeds to STEPS 202 and 204 to commence a new examination based on the next modulation type assumed.

If STEP 204 finds a match of the modulation type in an example then STEP 206 proceeds to decode and transmit the identification (ID) number. If STEP 204 does not find a match of the modulation type in an example then STEP 206 proceeds to STEP 208. STEP 208 in an example selects a third modulation type, for example PSK, or returns to the first modulation type, for example, ASK. An exemplary implementation demodulates PSK signals outside the processor 134 so, for example, the modulation type at STEP 208 at this point in the iteration reverts to the first modulation type as ASK rather than selecting PSK as a third modulation type.

Figure 3:
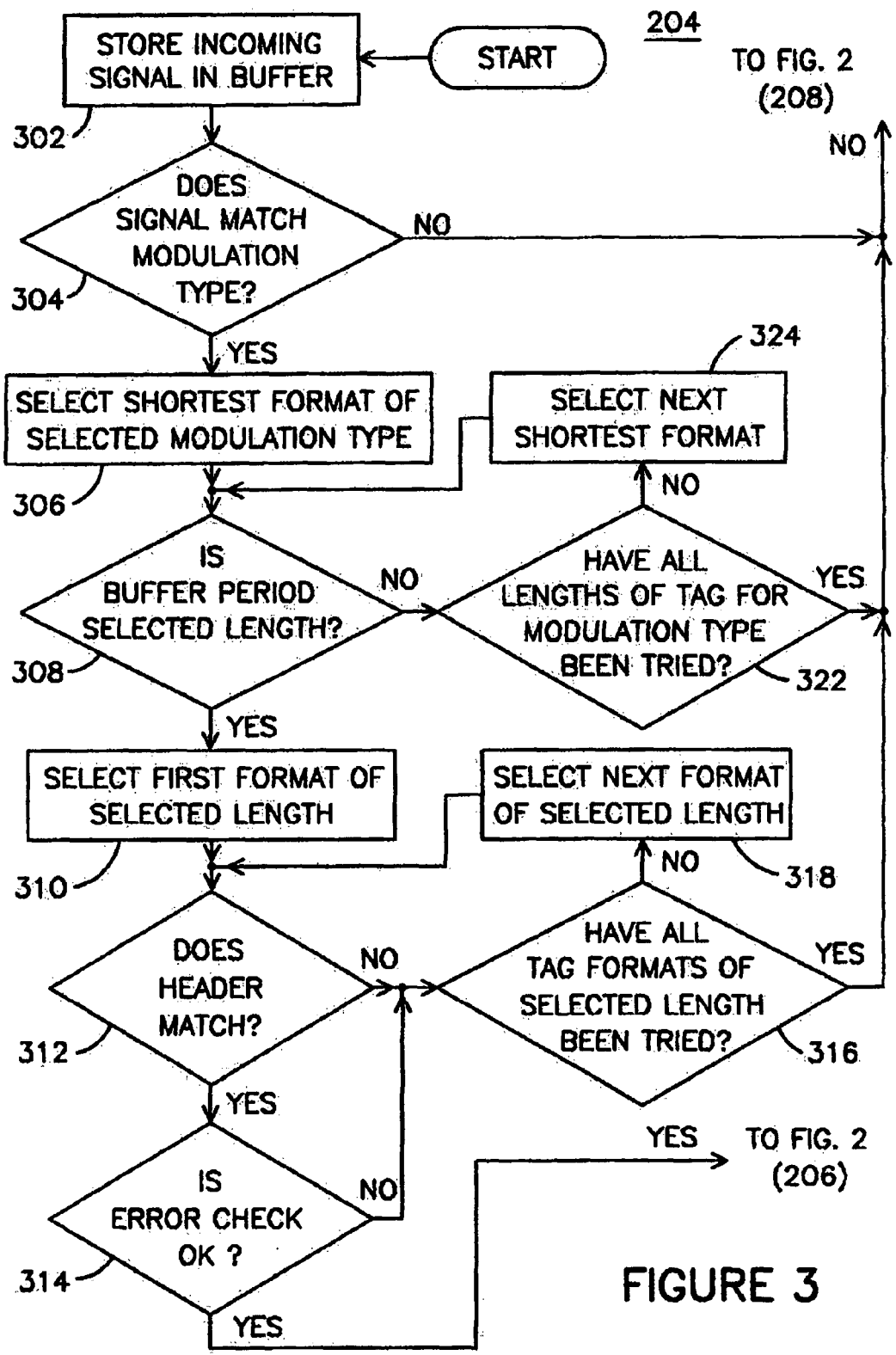

FIG. 3 is a representation of exemplary additional details of STEP 204. Exemplary additional details of STEP 204 in an example comprise the format length, header testing, and/or error checking process. STEP 204 in an example comprises an implementation of a main program that calls a number of subroutines in turn, and repeatedly, and transmits any identification (ID) numbers found. Exemplary subroutines are designed to terminate quickly, for example, to promote and/or maintain a relatively fast response.

STEP 302 in an example stores the signal 146 as the incoming RFID card data stream based on the signal 144, in a buffer. STEP 304 in an example tests the signal 146 to see if the buffered signal is consistent with the selected modulation type from STEP 202. If not consistent in an example a next modulation type is selected at STEP 208. If consistent in an example then STEPS 306, 308, 322, and 324 compare the buffered signal as the signal 146, with a plurality and/or multiplicity of data stream format lengths, possible and/or available with the selected modulation type. If no match is found in an example then a next modulation type is selected at STEP 208.

STEP 306 in an example performs format length comparison through selection of a shortest format of the selected modulation type through employment of a set of subroutines. STEP 306 compares the selected format to a period of the buffered signal as the signal 146 from STEP 302. If STEP 308 makes a determination that the buffer period does not match the format length then in an example STEP 324 selects the next shortest format of the selected modulation type. From STEP 324 in an example STEP 308 proceeds with a comparison of the next shortest format selected. An exemplary approach continues until all formats of the selected modulation type have been tried and/or reviewed, for example, without obtaining a match. STEP 322 in an example asks for a new modulation type to be selected if no match is found. An exemplary approach examines all formats of a selected length when a match is found to look for a presence of a header.

An exemplary header in an RFID card data stream in an example identifies where in the stream data decoding is to begin. Exemplary subroutines look for all and/or each of the header varieties of interest to a particular format length, for example, in STEPS 310, 312, 316, and 318. STEP 310 in an example selects a first format of the selected length. STEP 312 compares the first format to the buffered signal as the signal 146 to see if the format header is present. If not in an example STEP 318 selects a next format in an example until STEP 316 makes a determination that all formats of interest have been tested.

STEP 316 in an example asks for a next modulation type to be selected if no match is found. STEP 314 conducts an error-check consistent with the header type and format length if a match is found. An exemplary approach considers a possibility that the data stream of one format could comprise the header of another format, for example, accidentally. An exemplary implementation employs an error subroutine to detect such an occurrence. An exemplary approach considers a possibility that the buffered signal as the signal 146 comprises an error in the data. An exemplary implementation employs, review, checks, and/or examines parity bits, check sums, and the like to make a desired and/or appropriate determination, as will be appreciated by those skilled in the art. STEP 316 in an example asks for either a next format or a next modulation type if an error is found. If no error is found in an example STEP 206 decodes the buffered tag data through employment of the determined format and header and transmits the identification (ID) from the signal 144 obtained from the RFID card 104 as the signal 146.

In an exemplary implementation, several formats of an RFID card 104 may share the same modulation and baud rate. If the signal 144, 146 in an example is found to be incompatible with this modulation and baud rate, an exemplary approach eliminates with one test all such formats as possibilities. An exemplary increase in speed can result. In an example, where the beginnings of two subroutines may be implemented with the same code, they can be implemented in one subroutine. An exemplary approach considers a possibility where two formats are identical except one is half the baud rate of the other. If the buffer in memory of the processor 134 is sufficiently large, an exemplary implementation fills the buffer sampling at the higher baud rate and then the buffer is examined at both the higher and lower baud rates.

An exemplary implementation comprises a radio frequency identification (RFID) reader that employs substantially synchronized sampling to obtain a signal from an RFID card notwithstanding employment by the RFID card of any of amplitude shift keying (ASK), frequency shift keying (FSK), or phase shift keying (PSK). The RFID reader decodes the signal notwithstanding the employment by the RFID card of any of ASK, FSK, or PSK.

The RFID card comprises a PSK RFID card that employs PSK. The RFID reader employs substantially synchronized sampling to recover the signal from the PSK RFID card. The RFID reader employs substantially synchronized sampling to obtain a second signal from a second RFID card notwithstanding employment by the second RFID card of any of ASK, FSK, or PSK. The second RFID card comprises an FSK RFID card that employs FSK, wherein the RFID reader employs substantially synchronized sampling to recover the second signal from the FSK RFID card.

The signal from the RFID card comprises an identification number. The RFID reader comprises a processor that makes a determination from one or more characteristics of the signal from the RFID card whether ASK, FSK, or PSK was employed to encode the identification number in the signal. The processor decodes the identification number from the signal. The processor transmits the identification number to a readout device.

The RFID reader employs a signal frequency to generate a magnetic field that causes the RFID card to produce the signal based on the signal frequency. The RFID reader employs the signal frequency as a basis to substantially synchronously sample the signal. The RFID reader employs the signal frequency as the basis to substantially synchronously sample the signal to substantially eliminate the signal frequency in interpretation of the signal.

The RFID reader comprises a single path for the signal to traverse for the RFID reader to decode the signal in view of the employment by the RFID card of any of ASK, FSK, or PSK. The signal comprises an identification signal that the RFID reader obtains from the RFID card. The single path for the identification signal to traverse comprises one or more sample and hold circuits that serve to filter a carrier signal from the identification signal in view of the employment by the RFID card of any of ASK, FSK, or PSK.

The single path for the signal to traverse comprises one or more sample and hold circuits that employ a signal frequency employed for excitation of the RFID card as a basis to substantially eliminate the signal frequency in interpretation of the signal in view of the employment by the RFID card of any of ASK, FSK, or PSK. The one or more sample and hold circuits comprise one or more first sample and hold circuits. The single path for the signal to traverse comprises the one or more first sample and hold circuits and one or more second sample and hold circuits arranged in series. If the signal comprises a PSK signal then the one or more second sample and hold circuits demodulate the PSK signal to substantially resemble an ASK signal.

An exemplary implementation comprises a radio frequency identification (RFID) reader. A plurality of sample and hold circuits employ substantially synchronized sampling to obtain a signal from an RFID card notwithstanding employment by the RFID card of any of amplitude shift keying (ASK), frequency shift keying (FSK), or phase shift keying (PSK). A processor decodes the signal notwithstanding the employment by the RFID card of any of ASK, FSK, or PSK.

The plurality of sample and hold circuits comprises one or more first sample and hold circuits that employ a signal frequency employed for excitation of the RFID card as a basis to substantially eliminate the signal frequency in interpretation of the signal in view of the employment by the RFID card of any of ASK, FSK, or PSK.

The plurality of sample and hold circuits comprises the one or more first sample and hold circuits and one or more second sample and hold circuits. If the signal comprises a PSK signal then the one or more second sample and hold circuits demodulate the PSK signal to substantially resemble an ASK signal. Notwithstanding the employment by the RFID card of any of ASK, FSK, or PSK the processor decodes the signal whether as an actual ASK signal, an FSK signal, or the PSK signal demodulated to substantially resemble the ASK signal, respectively.

The plurality of sample and hold circuits employs substantially synchronized sampling to present the signal to the processor as an actual ASK signal, an actual FSK signal, or a PSK signal that substantially resembles the actual ASK signal. The processor decodes any of the actual ASK signal, the actual FSK signal, or the PSK signal that substantially resembles the actual ASK signal from the plurality of sample and hold circuits.

The processor makes a determination of an active signal type of any of the actual ASK signal, the actual FSK signal, or the PSK signal that substantially resembles the actual ASK signal from the plurality of sample and hold circuits. The processor employs a determination of an active data stream format to decode an active signal type of any of the actual ASK signal, the actual FSK signal, or the PSK signal that substantially resembles the actual ASK signal from the plurality of sample and hold circuits. The processor accesses a library of available data stream formats to make the determination of the active data stream format.

The processor reduces the signal to an identification (ID) number. The processor reduces the signal to a serial code that serves to establish an identity of a holder and/or owner of the RFID card.

An exemplary approach employs substantially synchronized sampling to obtain a signal from an RFID card notwithstanding employment by the RFID card of any of amplitude shift keying (ASK), frequency shift keying (FSK), or phase shift keying (PSK). There is decoding of the signal notwithstanding the employment by the RFID card of any of ASK, FSK, or PSK.

An implementation of the apparatus 100 in an example comprises a plurality of components such as one or more of electronic components, mechanical components, hardware components, and/or computer software components. A number of such components can be combined or divided in an implementation of the apparatus 100. In one or more exemplary implementations, one or more features described herein in connection with one or more components and/or one or more parts thereof are applicable and/or extendible analogously to one or more other instances of the particular component and/or other components in the apparatus 100. In one or more exemplary implementations, one or more features described herein in connection with one or more components and/or one or more parts thereof may be omitted from or modified in one or more other instances of the particular component and/or other components in the apparatus 100. An exemplary technical effect is one or more exemplary and/or desirable functions, approaches, and/or procedures. An exemplary component of an implementation of the apparatus 100 employs and/or comprises a set and/or series of computer instructions written in or implemented with any of a number of programming languages, as will be appreciated by those skilled in the art. An implementation of the apparatus 100 in an example comprises any (e.g., horizontal, oblique, angled, or vertical) orientation, with the description and figures herein illustrating an exemplary orientation of an exemplary implementation of the apparatus 100, for explanatory purposes.

An implementation of the apparatus 100 in an example encompasses an article. The article comprises one or more computer-readable signal-bearing media. The article comprises means in the one or more media for one or more exemplary and/or desirable functions, approaches, and/or procedures.

An implementation of the apparatus 100 in an example employs one or more computer readable signal bearing media. A computer-readable signal-bearing medium in an example stores software, firmware and/or assembly language for performing one or more portions of one or more implementations. An example of a computer-readable signal bearing medium for an implementation of the apparatus 100 comprises a memory and/or recordable data storage medium of the processor 134 and/or the integrated circuit 152 of the RFID card 104. A computer-readable signal-bearing medium for an implementation of the apparatus 100 in an example comprises one or more of a magnetic, electrical, optical, biological, chemical, and/or atomic data storage medium. For example, an implementation of the computer-readable signal-bearing medium comprises one or more floppy disks, magnetic tapes, CDs, DVDs, hard disk drives, and/or electronic memory. In another example, an implementation of the computer-readable signal-bearing medium comprises a modulated carrier signal transmitted over a network comprising or coupled with an implementation of the apparatus 100, for instance, one or more of a telephone network, a local area network ("LAN"), a wide area network ("WAN"), the Internet, and/or a wireless network.

The steps or operations described herein are examples. There may be variations to these steps or operations without departing from the spirit of the invention. For example, the steps may be performed in a differing order, or steps may be added, deleted or modified.

Although exemplary implementation of the invention has been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. An apparatus, comprising:
a radio frequency identification (RFID) reader that employs synchronized sampling to obtain a modulation signal from an RFID card notwithstanding employment by the RFID card of any of amplitude shift keying (ASK), frequency shift keying (FSK), or phase shift keying (PSK);
wherein the RFID reader employs a signal frequency that is employed to generate a magnetic field that causes the RFID card to produce modulation of the magnetic field, wherein the RFID reader employs the signal frequency to attenuate magnetic field contamination from the modulation signal;
wherein the modulation signal comprises one or more sub-harmonics of the magnetic field, wherein the RFID reader employs synchronized sampling at the magnetic field frequency to further attenuate the magnetic field contamination;
wherein the modulation signal comprises an identification signal that the RFID reader obtains from the RFID card;
wherein the RFID reader comprises a processor, wherein a single path comprises one or more sample and hold circuits for the identification signal to traverse to the processor of the RFID reader to decode the modulation signal in view of the employment by the RFID card of any of ASK, FSK, or PSK;
wherein the RFID reader decodes the modulation signal notwithstanding the employment by the RFID card of any of ASK, FSK, or PSK.

2. The apparatus of claim 1, wherein the RFID card comprises a PSK RFID card that employs PSK, wherein the RFID reader employs synchronized sampling to recover the modulation signal from the PSK RFID card.

3. The apparatus of claim 2, wherein the RFID reader employs synchronized sampling to obtain a second signal from a second RFID card notwithstanding employment by the second RFID card of any of ASK, FSK, or PSK.

4. The apparatus of claim 3, wherein the second RFID card comprises an FSK RFID card that employs FSK, wherein the RFID reader employs synchronized sampling to recover the second signal from the FSK RFID card.

5. The apparatus of claim 1, wherein the identification signal of the modulation signal from the RFID card comprises an identification number, wherein the processor of the RFID reader makes a determination from one or more characteristics of the modulation signal from the RFID card whether ASK, FSK, or PSK was employed to encode the identification number in the modulation signal, wherein the processor of the RFID reader decodes the identification number from the modulation signal, wherein the processor of the RFID reader transmits the identification number to a readout device.

6. The apparatus of claim 1, wherein the RFID reader employs the signal frequency as a basis to synchronously sample the modulation signal.

7. The apparatus of claim 6, wherein the RFID reader employs the signal frequency as the basis to synchronously sample the modulation signal to attenuate the signal frequency in interpretation of the modulation signal.

8. The apparatus of claim 1, wherein the RFID reader comprises a single path for the identification signal to traverse for the RFID reader to decode the modulation signal in view of the employment by the RFID card of any of ASK, FSK, or PSK.

9. The apparatus of claim 1, wherein the RFID card comprises a PSK RFID card that employs PSK, wherein the RFID reader employs synchronized sampling to obtain the identification signal of the modulation signal from the PSK RFID card.

10. The apparatus of claim 8, wherein the one or more sample and hold circuits of the single path for the identification signal to traverse employ the signal frequency employed for excitation of the RFID card as a basis to eliminate the signal frequency in interpretation of the modulation signal in view of the employment by the RFID card of any of ASK, FSK, or PSK.

11. The apparatus of claim 10, wherein the one or more sample and hold circuits comprise one or more first sample and hold circuits, wherein the single path for the identification signal to traverse comprises the one or more first sample and hold circuits and one or more second sample and hold circuits arranged in series;
wherein if the modulation signal comprises a PSK signal then the one or more second sample and hold circuits demodulate the PSK signal to resemble an ASK signal.

12. A radio frequency identification (RFID) reader, comprising:
a plurality of sample and hold circuits that employs synchronized sampling to obtain a modulation signal from an RFID card notwithstanding employment by the RFID card of any of amplitude shift keying (ASK), frequency shift keying (FSK), or phase shift keying (PSK); and
a processor that decodes the modulation signal notwithstanding the employment by the RFID card of any of ASK, FSK, or PSK;
wherein the plurality of sample and hold circuits employs a signal frequency that is employed to generate a magnetic field that causes the RFID card to produce modulation of the magnetic field, wherein the plurality of sample and hold circuits employs the signal frequency to attenuate magnetic field contamination from the modulation signal;
wherein the modulation signal comprises one or more subharmonics of the magnetic field, wherein the plurality of sample and hold circuits employs synchronized sampling at the magnetic field frequency to further attenuate the magnetic field contamination;
wherein the modulation signal comprises an identification signal that the plurality of sample and hold circuits obtains from the RFID card;
wherein a single path comprises one or more sample and hold circuits for the identification signal to traverse to the processor to decode the modulation signal in view of the employment by the RFID card of any of ASK, PSK, or PSK.

13. The RFID reader of claim 12, wherein the plurality of sample and hold circuits comprises one or more first sample and hold circuits that employ a signal frequency employed for excitation of the RFID card as a basis to attenuate the signal frequency in interpretation of the modulation signal in view of the employment by the RFID card of any of ASK, FSK, or PSK.

14. The RFID reader of claim 13, wherein the plurality of sample and hold circuits comprises the one or more first sample and hold circuits and one or more second sample and hold circuits;
wherein if the modulation signal comprises a PSK signal then the one or more second sample and hold circuits demodulate the PSK signal to resemble an ASK signal;
wherein notwithstanding the employment by the RFID card of any of ASK, FSK, or PSK the processor decodes the modulation signal whether as an actual ASK signal, an FSK signal, or the PSK signal demodulated to resemble the ASK signal, respectively.

15. The RFID reader of claim 12, wherein the plurality of sample and hold circuits employs synchronized sampling to present the modulation signal to the processor as an actual ASK signal, an actual FSK signal, or a PSK signal that resembles the actual ASK signal.

16. The RFID reader of claim 15, wherein the processor decodes any of the actual ASK signal, the actual FSK signal, or the PSK signal that resembles the actual ASK signal from the plurality of sample and hold circuits.

17. The RFID reader of claim 16, wherein the processor makes a determination of an active signal type of any of the actual ASK signal, the actual FSK signal, or the PSK signal that resembles the actual ASK signal from the plurality of sample and hold circuits.

18. The RFID reader of claim 16, wherein the processor employs a determination of an active data stream format to decode an active signal type of any of the actual ASK signal, the actual FSK signal, or the PSK signal that resembles the actual ASK signal from the plurality of sample and hold circuits.

19. The RFID reader of claim 18, wherein the processor accesses a library of available data stream formats to make the determination of the active data stream format.

20. The RFID reader of claim 12, wherein the processor reduces the identification signal of the modulation signal to an identification (ID) number.

21. The RFID reader of claim 12, wherein the processor reduces the modulation signal to a serial code that serves to establish an identity of a holder and/or owner of the RFID card.

22. A method, comprising the steps of:
employing synchronized sampling to obtain a modulation signal that comprises an identification signal from an RFID card notwithstanding employment by the RFID card of any of amplitude shift keying (ASK), frequency shift keying (FSK), or phase shift keying (PSK);

employing a signal frequency that is employed to generate a magnetic field that causes the RFID card to produce modulation of the magnetic field;

employing the signal frequency to attenuate magnetic field contamination from the modulation signal, wherein the modulation signal comprises one or more subharmonics of the magnetic field;

employing synchronized sampling at the magnetic field frequency to further attenuate the magnetic field contamination; and decoding the modulation signal notwithstanding the employment by the RFID card of any of ASK, FSK, or PSK, wherein the identification signal traverses a single path for the decoding of the modulation signal in view of the employment by the RFID card of any of ASK, FSK, or PSK.

* * * * *